(12) United States Patent  (10) Patent No.: US 7,714,252 B2
Casner et al.  (45) Date of Patent: *May 11, 2010

(54) SYSTEM AND METHOD FOR A TEMPERATURE DEPENDENT DUTY CYCLE WITHIN A WELDING-TYPE APPARATUS

(75) Inventors: Bruce A. Casner, Neenah, WI (US); Mark Ulrich, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1418 days.

This patent is subject to a terminal disclaimer.

(21) Appl. No.: 10/904,966

(22) Filed: Dec. 7, 2004

(65) Prior Publication Data

US 2006/0118534 A1 Jun. 8, 2006

(51) Int. Cl.
  *B23K 9/10* (2006.01)
(52) U.S. Cl. ............... 219/130.21; 219/136; 219/137 R
(58) Field of Classification Search ............ 219/130.21, 219/98, 99, 130.01, 136, 137 R, 133
  See application file for complete search history.

(56) References Cited

U.S. PATENT DOCUMENTS

| | | | | |
|---|---|---|---|---|
| 3,018,361 A * | 1/1962 | Rebuffoni | ..................... | 219/98 |
| 3,029,375 A * | 4/1962 | English et al. | ................ | 219/98 |
| 4,241,285 A * | 12/1980 | Golonka et al. | ............... | 219/98 |
| 4,804,811 A * | 2/1989 | Raycher et al. | ............... | 219/98 |
| 5,760,563 A * | 6/1998 | Bennett et al. | .............. | 318/641 |
| 6,132,573 A * | 10/2000 | Cubukcu et al. | ............ | 204/262 |
| 7,297,899 B2 * | 11/2007 | Fosbinder | ................... | 219/133 |

* cited by examiner

*Primary Examiner*—Stephen J Ralis
(74) *Attorney, Agent, or Firm*—Fletcher Yoder

(57) ABSTRACT

A duty cycle controller having a processor configured to control a welding-type apparatus is disclosed. In one embodiment, the processor may be configured to control the welding-type apparatus according to a variable maximum duty cycle to substantially delay entry into a thermal shutdown mode of the welding-type apparatus based on at least one operating condition. Various additional devices and methods are also disclosed.

32 Claims, 3 Drawing Sheets

SYSTEM AND METHOD FOR A TEMPERATURE DEPENDENT DUTY CYCLE WITHIN A WELDING-TYPE APPARATUS

BACKGROUND OF THE INVENTION

The present invention relates generally to welding-type systems and welding-type power sources and, more particularly, to a controller for welding-type systems configured to control a welding-type system to operate according to a variable maximum duty cycle based on a current temperature, in, about, or of the welding-type system to reduce the likelihood of inducing a thermal shutdown of the welding-type system. Furthermore, since the present invention has a temperature feedback input, allows the variable maximum duty cycle to exceed a rated duty cycle under appropriate operating conditions thereby enabling the welding-type system to operate above the rated duty cycle.

There are numerous variations of welding-type systems. Each variation of welding-type system is typically designed to operate according to one or more specific welding-type processes. For example, some common welding-type systems are designed to operate according to a Metal Inert Gas (MIG) welding-type process, formerly known as Gas Metal Arc Welding-type (GMAW) process, a Tungsten Inert Gas (TIG) welding-type process, a Shielded Metal Arc Welding-type (SMAW) process, a stud welding process, a plasma-cutting process, induction heating process, or other welding-type processes.

All welders and welding-type processes employ components that generate heat during operation. For example, stud welding processes are designed to supply high current for short periods. That is, stud welding is a welding process that utilizes a localized burst of current between a metallic fastener and a metallic work piece. In most instances, although not required, the fastener and the work piece have the same material properties. The fasteners are held and welded in place through the use of an electromechanical device known as a stud gun. A stud welder power source generates and discharges a high current output in a short period of time that serves to weld the stud to the workpiece.

The high power generation and discharge associated with welding processes result in a high level of stress on the components of the welder. As such, some welding machines typically have relatively low duty cycles. Generally, the welder is designed to have a rated maximum duty cycle based on an assumed maximum operating temperature. That is, welders are designed to operate at a maximum duty cycle corresponding to temperature tolerance of the welder. To ensure that the welder operates within this temperature tolerance under all operational conditions, the maximum duty cycle is typically fixed so that the welder remains below the temperature tolerance under relatively high temperature operating conditions. For example, stud welders are typically physically limited by a fixed time lapse between welds that is based on a "worse-case" operating environment where the stud welder is operated under the harshest of operating conditions that include a maximum operating temperature.

In this case, regardless of operating conditions, the duty cycle of the stud welder is limited by a maximum duty cycle when, in fact, it may not be operating at the maximum temperature tolerance of the power supply. Therefore, although operating temperatures would allow performing at a higher duty cycle, the stud welder is precluded from operating above the rated duty cycle. That is, under some operating conditions, such as when the operating temperature is below the "maximum," the power supply may be capable of operating above the "worst-case" rated duty cycle, but is restricted from exceeding the "worst-case" rated duty cycle.

Although most welders employ a hard duty cycle limit to keep the operating temperature below the temperature tolerance of the power supply, the temperature, in, about, or of the power supply may still surpass the maximum temperature tolerance of the welder. Accordingly, welders often utilize a thermal shutdown mode whereby, if the operational temperature of the welder approaches or surpasses the maximum temperature tolerance, the welder enters a thermal shutdown and ceases operation. Specifically, should the operational temperature of the welder surpass the maximum temperature tolerance, the welder power source enters a "standby" or thermal shutdown mode that allows the welder to cool.

While this thermal shutdown mode protects the welder from possible damage due to overheating, it also interrupts the welding process. Accordingly, should the power source enter the thermal shutdown mode, the operation of welder idled. This break in the workflow can be particularly undesirable in settings where there may be interdependence between various procedures. In some cases, a significant break in the welding process may require corresponding delays in subsequent steps in the workflow.

Additionally, a break in the workflow necessitated by the welder entering a thermal shutdown mode may encourage an operator to leave the welder workstation while the welder cools. As such, the operator may not be present to resume the welding process precisely when the welder returns from the thermal shutdown mode. As a result, the break in the workflow caused by the welder entering the thermal shutdown mode may be unnecessarily extended. As a result, additional delays are incurred in the workflow and productivity is further decreased.

It would therefore be desirable to design a system that may be controlled to operate above a maximum rated duty cycle of the system based upon actual operational conditions, such as temperature. Furthermore, it would be desirable to have a welding system with a variable duty cycle and a controller configured to dynamically adjust the variable duty cycle to reduce the likelihood of the welding system entering a thermal shutdown.

BRIEF DESCRIPTION OF THE INVENTION

The present invention is directed to a welding-type apparatus that overcomes the aforementioned drawbacks. Specifically, the present invention includes a controller configured to operate a welding-type device in excess of a rated maximum duty cycle. That is, the present invention includes a controller configured to control a welding-type device to have a variable maximum duty cycle determined from actual or current operating conditions of the welding-type device. The controller is also configured to dynamically adjust the variable maximum duty cycle to reduce the probability of the welding-type device entering a thermal standby mode under the current operating conditions.

Therefore, the present invention includes a duty cycle controller having a processor configured to control a welding-type apparatus according to a variable maximum duty cycle to substantially delay entry into a thermal shutdown mode of the welding-type apparatus based on at least one operating condition.

In accordance with another aspect of the present invention, a method of operating a welding-type device is disclosed. The method includes determining a condition of at least one operating parameter of a welding-type device and determining a variable maximum duty cycle of the welding-type device from the condition of the at least one operating parameter. The method also includes adjusting operation of the welding-type device according to a variable maximum duty cycle to substantially reduce thermal shutdowns.

According to another aspect of the present invention, a welding-type device is disclosed that includes a welding-type power source configured to provide operational power for a welding-type process. The welding-type device also includes a controller configured to monitor operating conditions associated with the welding-type device and dynamically adjust a base duty cycle of the welding-type power source to operate above a rated duty cycle if the operating conditions are under a rated maximum parameter threshold of the operating conditions to substantially reduce occurrences of entering a thermal shutdown mode.

In accordance with yet another aspect of the present invention, a welding-type apparatus is disclosed that includes means for detecting a temperature associated with a welding-type apparatus and means for generating operational power for a welding-type process. The welding-type device also includes means for comparing the detected temperature associated with the welding-type apparatus to a temperature threshold and means for controlling the means for generating operational power according to means for comparing. Additionally, the means for controlling is configured to control the means for generating operational power to operate above a rated maximum duty cycle if the detected temperature of the welding-type apparatus is below the temperature threshold.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention is directed to a welding-type apparatus and, more specifically, to a welding-type apparatus that includes a controller configured to control the welding-type apparatus to operate according to a variable maximum duty cycle that can exceed a rated maximum duty cycle of the welding-type apparatus. The controller monitors the current operating conditions of the welding-type apparatus and dynamically adjusts the variable maximum duty cycle to reduce the likelihood of the welding-type apparatus entering a thermal standby mode and interrupting workflow.

As one skilled in the art will fully appreciate, the hereinafter description of welding devices not only includes welders but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with systems such as cutting and induction heating systems.

Figure 1:
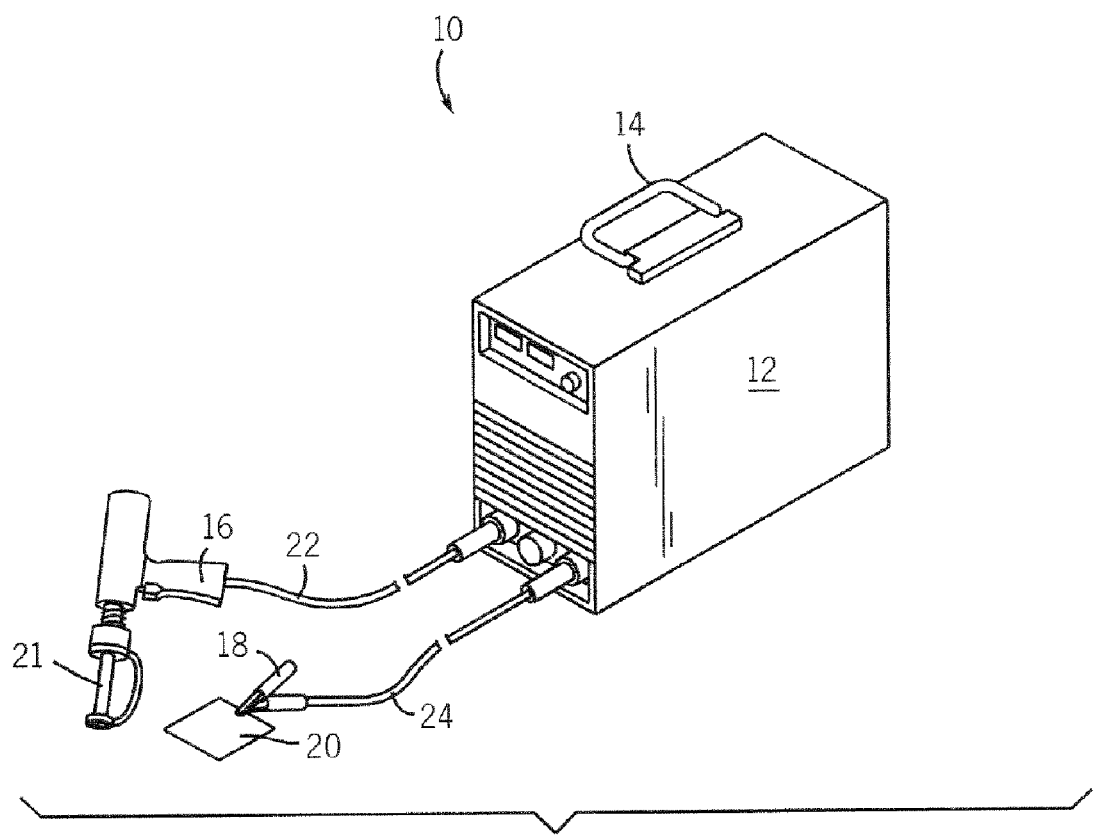
FIG. 1 is a perspective view of a welding-type apparatus incorporating the present invention.

FIG. 1 shows a stud welding system 10 in accordance with the present invention. The stud welding system 10 includes a housing 12 enclosing the internal components of the welding power source including a duty cycle controller, thermal shutdown controller, and various sensors as will be described in detail with respect to FIGS. 2 and 3. The stud welding system 10 is of such compact construction, that it includes a handle 14 for easily transporting the welding system from one location to another. To effectuate the welding process, the stud welding system 10 includes a stud welding gun 16 as well as a work clamp 18. The work clamp 18 is configured to complete the welding circuit to a workpiece 20 to be welded. Connecting the stud welding gun 16 and work clamp 18 to the housing 12 is a pair of cables 22 and 24, respectively.

Figure 2:
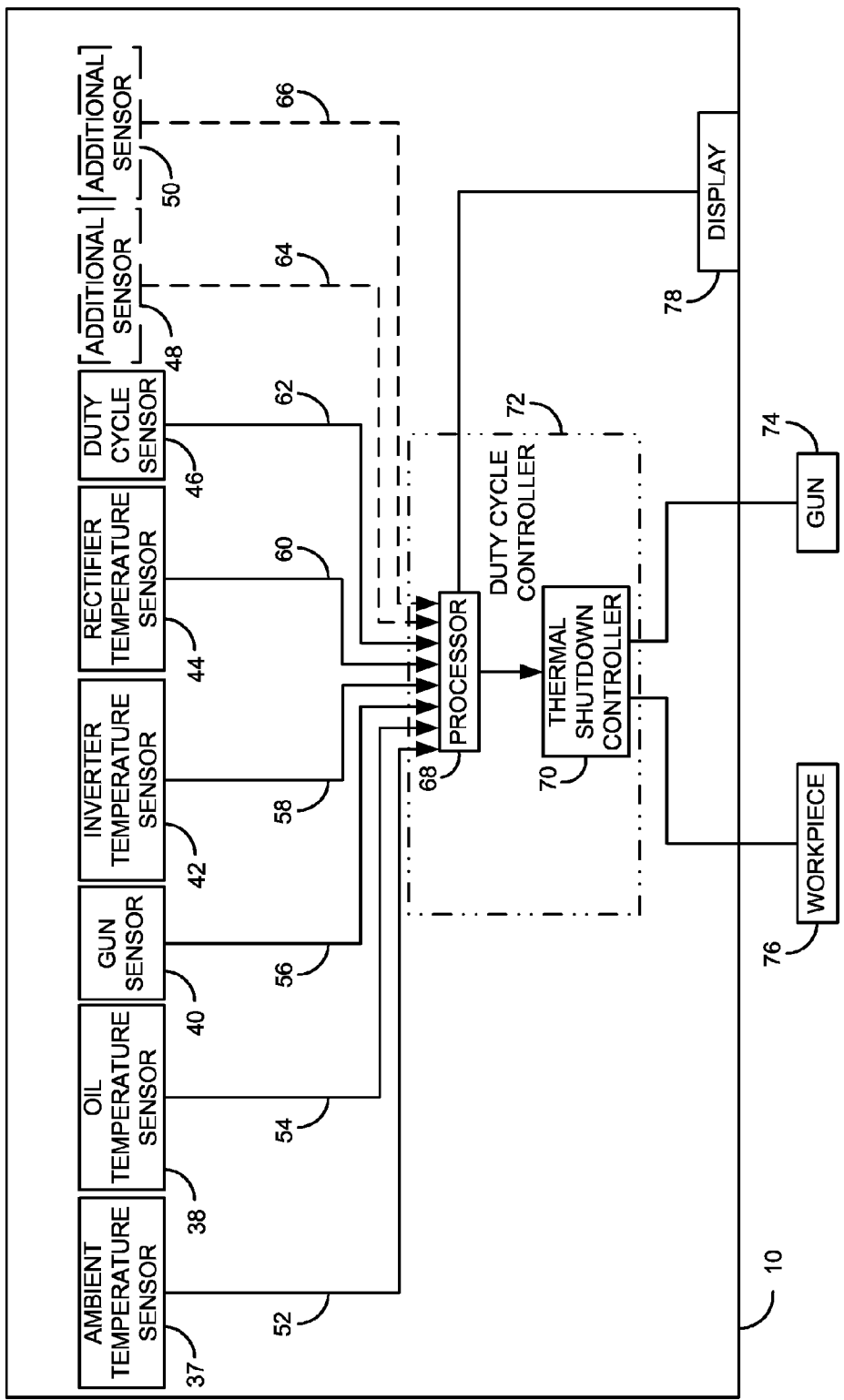
FIG. 2 is a block diagram illustrating some of the components of the welding-type apparatus shown in FIG. 1 in accordance with one embodiment of the invention.

Referring to FIG. 2, a block diagram of some of the components of the stud welding system 10 is shown. Specifically, the stud welding system 10 includes a variety of sensors, including an ambient temperature sensor 37, an oil temperature sensor 38 (e.g., engine oil temperature sensor), a hot start sensor 40, an inverter temperature sensor 42, a rectifier temperature sensor 44, and a duty cycle sensor 46. The sensors may be configured to monitor a wide variety of conditions and can, therefore, include additional sensors 48, 50, which may be configured to monitor any of a variety of specific areas or components of the stud welding system 10.

The sensors 37-50 are connected via feedback cables 52-66 to a controller or processor 68, which, as will be described with reference to FIG. 3, interprets the feedback from the sensors 37-50 and controls the operation of a thermal shutdown controller 70. As will be described, the processor 60 and thermal shutdown controller 70 form a duty cycle controller 72 that functions to control the duty cycle of the stud welding system 10 based on feedback received from the sensors 37-50. Specifically, as will be described with respect to FIG. 3, the duty cycle controller 72 controls the operation of the stud welding system 10 to operate according to a variable maximum duty cycle that, dependent upon operating conditions, can exceed a rated maximum duty cycle while substantially reducing the potential for entering thermal shutdown or standby. That is, the duty cycle controller 72 functions to determine and control whether to allow the stud welding system 10 to provide power to a gun 74 and workpiece 76 to effectuate the desired stud welding process under the current operational conditions such that the stud welding system 10 substantially avoids entering a thermal shutdown mode.

For example, the processor 68 receives feedback from the sensors 37-50 to determine whether, under the current operational conditions, the duty cycle of the stud welding system 10 may be increased or should be decreased to substantially avert thermal shutdowns. That is, if the processor 68 determines from feedback received by the sensors 37-50 that the current temperature of the stud welding system 10 is above a maximum temperature threshold, the processor 68 may need to cause the thermal shutdown controller 70 to postpone the current duty cycle limits until a predetermined thermal cooling period has expired or the temperature of the stud welding system 10 has dropped below the maximum temperature.

In this case, the processor 68 signals that a thermal shutdown has been initiated and a message is conveyed via a display 78 to inform an operator that the stud welding system 10 must cool before resuming the desired welding process. It is contemplated that this message may include a notice that the welding system 10 has entered a thermal shutdown and/or may include a countdown timer to inform the operator of the remaining duration of the thermal shutdown. Furthermore, it is contemplated that the processor 68 may via the display informing that a thermal shutdown is impending. However, as will be described in detail with respect to FIG. 3, the processor 68 or duty cycle controller 72 functions to dynamically control the duty cycle of the stud welding system 10 to operate at a duty cycle that may exceed a maximum rated duty cycle while substantially avoiding or lowering the probability of entering a thermal shutdown.

Figure 3:
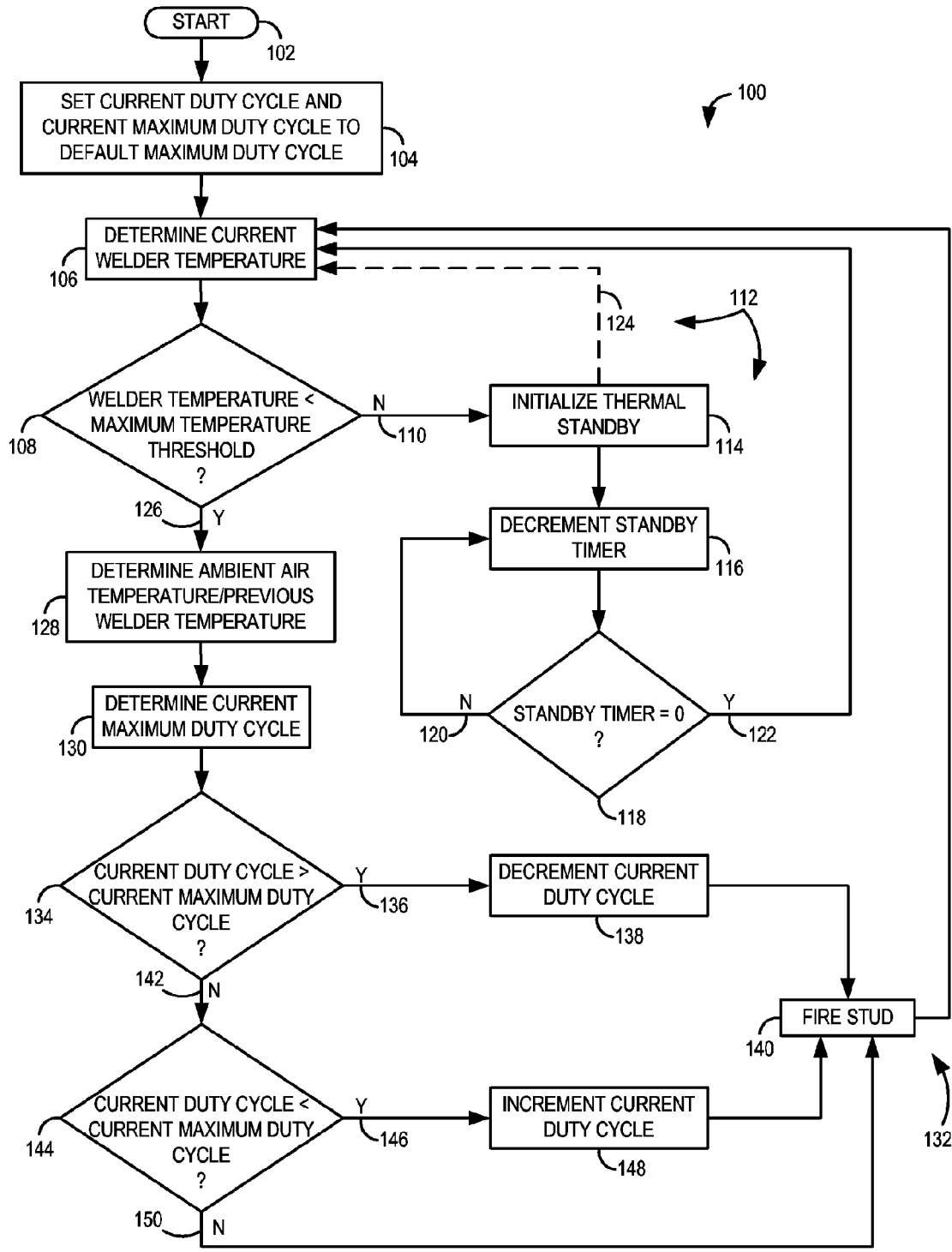
FIG. 3 is a flow chart illustrating a control technique in accordance with one embodiment of the invention.

Referring to FIG. 3, a flow chart setting forth the steps of a technique 100 for controlling the operation of the stud welding system is shown. The technique starts 102 upon powering the stud welding system. Upon startup 102, a default maximum duty cycle is set to be the current duty cycle and current maximum duty cycle 104. In accordance with one embodiment, the default maximum duty cycle is a rated duty cycle of the stud welding system. That is, it is contemplated that the default duty cycle of the stud welding system may be the rated duty cycle of the stud welding system such as is used in traditional stud welding systems as a hard or fixed duty cycle limit. However, as will be described, the technique 100 allows the current maximum duty cycle and, therefore, the current duty cycle to exceed the rated duty cycle of the stud welding system.

Once the default maximum duty cycle is set to be the current duty cycle and the current maximum duty cycle 104, the system determines the current temperature associated with the stud welding system 106. The current temperature associated with the welder is then compared to a maximum temperature threshold or tolerance of the stud welding system 108.

If the current welder temperature is not less than the maximum temperature threshold 110, the system enters a thermal standby loop 112. As will be described, the technique 100 is designed to significantly and substantially reduce the likelihood of entering the thermal shutdown loop 112. However, it is contemplated that under some operating conditions the system may be caused to reach a temperature sufficient to cause entry into the thermal standby loop 112. Once the thermal standby loop 112 is entered, the thermal standby is initiated 114.

In accordance with one embodiment, a standby timer countdown is used to determine the duration of the thermal standby period. In this case, initialization of thermal standby 114 includes initiating a break in the welding process and initializing the standby timer. The thermal standby loop 112 continues by decrementing the standby timer 116. A check is then made to determine whether the standby timer has reached zero 118. If the standby timer has not yet reached zero 120, the standby timer is again decremented 116 and another check is made to determine whether the standby timer has reached zero 118. Once the standby timer has reached zero 122 another check is made to determine the temperature currently associated with the welder 106, which is again compared to the maximum temperature threshold 108 to ensure that the thermal standby loop 112 was of sufficient duration to allow the current temperature associated with the welder to drop below the maximum temperature threshold 108.

Alternatively, rather than using a standby timer to determine the duration of the thermal standby, the thermal standby loop 112 may simply include an initialization of the thermal standby 114 by initiating a break in the welding process and then a loop 124 back to determine the current welder temperature 106. According to this alternative embodiment, the technique continues to loop through determining the current welder temperature 106, comparing the current welder temperature to the maximum temperature threshold 108, and initializing thermal standby 114 until the current welder temperature drops below the maximum temperature threshold 126. Accordingly, rather than utilizing the previously-described predetermined standby timer, which could result in the thermal standby continuing beyond the current welder temperature falling below the maximum temperature threshold 126, the technique 100 continuously check the current welder temperature against the maximum temperature threshold 108. Therefore, the duration of the thermal standby is discontinued and welding is permitted to continue once the current welder temperature is less than the maximum temperature threshold 126.

In any case, if the current welder temperature is less than the maximum temperature threshold 126, the system determines the ambient air temperature or uses the "current welder temperature" 106 previously detected 128. Specifically, it is contemplated that they system may include an ambient temperature sensor, as previously described with respect to FIG. 2, to determine the ambient air temperature within which the welding system is operating. However, if no ambient temperature sensor is included, the system may use the current temperature associated with the welder or power supply of the welder previously determined at step 106. Additionally, it is contemplated that a combination of both the ambient air temperature and the current welder temperature may be utilized.

The technique 100 continues by determining the current maximum duty cycle 130. As previously described, the current maximum duty cycle is initially set to the default maximum duty cycle 104 but, as will be described, may later be altered. That is, since the technique 100 includes a duty cycle loop 132 that cyclically occurs during each duty cycle of the stud welding system, the current maximum duty cycle 130 may vary. Specifically, on the first cycle through the duty cycle loop 132 following startup 102, the current maximum duty cycle is set to the default maximum duty cycle 104 and determination of the current maximum duty cycle 130 is readily complete. However, as will be described, once the technique 100 cycles through the duty cycle loop 132, the current maximum duty cycle must be determined 130 based on the previous determination of the ambient air temperature/current welder temperature 128. In particular, the system uses the ambient air temperature/current welder temperature 128 to determine whether the operating conditions, particularly the temperature in, of, and/or about the welding system permits the current maximum duty cycle to be increased without putting the system at a substantial risk of entering the thermal shutdown loop 112.

Once the current maximum duty cycle is determined 130, the current duty cycle is compared to the current maximum duty cycle 134. If the current duty cycle is greater than the current maximum duty cycle 136, the welder is operating at a current duty cycle that could cause the current temperature of the welder to rise above the maximum temperature threshold and thereby cause the system to enter the thermal standby loop 112. Accordingly, the current duty cycle is decremented 138 to lower the probability that thermal standby may be triggered and, according to the limits of the decremented duty cycle 138, a stud is fired 140. It is contemplated that the amount by which the duty cycle is decremented may vary proportionally with the deviation of the current duty cycle from the current maximum duty cycle. Additionally, the amount by which the duty cycle is decremented may change based on the time in use and/or temperature of the welder.

However, if the current duty cycle is not greater than the current maximum duty cycle 142, a check is made to determine whether the current duty cycle is less than the current maximum duty cycle 144. If the current duty cycle is less than the maximum duty cycle 146, the welder is operating at a current duty cycle that could be increased without imminently causing the current temperature associated with welder to rise above the maximum temperature threshold and thereby causing the system to enter thermal standby. As such, the current duty cycle is incremented 148 and a stud is fired 140 according to the incremented duty cycle. Again, it is contemplated that the amount by which the duty cycle is incremented may vary proportionally with the deviation of the current duty cycle from the current maximum duty cycle. Furthermore, the amount by which the duty cycle is incremented may be adjusted based on the time in use and/or temperature of the welder.

On the other hand, if the current duty cycle is not greater than the current maximum duty cycle 142 or less than the current maximum duty cycle 150, the current duty cycle is within tolerance or within the specifications of the welding system under the current operating conditions and a stud is fired 140 without changing the duty cycle. It is recognized that upon startup 102 the current duty cycle and current maximum duty cycle are set to the default maximum duty cycle 104 and, therefore, the current duty cycle will be equal to the maximum duty cycle 150 during the first pass through the duty cycle loop 132 following startup 102. As such, a stud is fired 140 without any augmentation to or delay in the duty cycle.

Once the stud is fired 140, the technique reiterates by again determining the current temperature of the welder 106 so as to include any temperature increases or decreases due to the stud firing 140 and/or the changes to the duty cycle 138, 148.

Accordingly, a technique is achieved that is controlled to operate above a maximum rated duty cycle dependant upon actual operational conditions, such as temperature. Furthermore, the technique is capable of dynamically adjusting the current duty cycle to reduce the likelihood of the welding system entering a thermal standby state.

Therefore, in accordance with one embodiment of the present invention, a duty cycle controller includes a processor configured to control a welding-type apparatus according to a variable maximum duty cycle to substantially delay entry into a thermal shutdown mode of the welding-type apparatus based on at least one operating condition.

According to another embodiment of the present invention, a method of operating a welding-type device includes determining a condition of at least one operating parameter of a welding-type device and determining a variable maximum duty cycle of the welding-type device from the condition of the at least one operating parameter. The method also includes adjusting operation of the welding-type device according to a variable maximum duty cycle to substantially reduce thermal shutdowns.

According to yet a further embodiment of the present invention, a welding-type device includes a welding-type power source configured to provide operational power for a welding-type process. The welding-type device also includes a controller configured to monitor operating conditions associated with the welding-type device and dynamically adjust a base duty cycle of the welding-type power source to operate above a rated duty cycle if the operating conditions are under a rated maximum parameter threshold of the operating conditions to substantially reduce occurrences of entering a thermal shutdown mode.

According to another embodiment of the present invention, a welding-type apparatus is includes means for detecting a temperature associated with a welding-type apparatus and means for generating operational power for a welding-type process. The welding-type device also includes means for comparing the detected temperature associated with the welding-type apparatus to a temperature threshold and means for controlling the means for generating operational power according to means for comparing. Additionally, the means for controlling is configured to control the means for generating operational power to operate above a rated maximum duty cycle if the detected temperature of the welding-type apparatus is below the temperature threshold.

The present invention has been described in terms of the preferred embodiment, and it is recognized that equivalents, alternatives, and modifications, aside from those expressly stated, are possible and within the scope of the appending claims.

What is claimed is:

1. A duty cycle controller comprising:
   a processor configured to control a current duty cycle of a welding-type apparatus according to a variable maximum duty cycle to substantially delay entry into a thermal shutdown mode of the welding-type apparatus based on at least one operating condition;
   wherein the processor is further configured to control the welding-type apparatus to set the current duty cycle below a rated maximum duty cycle of the welding-type apparatus if a temperature associated with the welding-type apparatus is greater than a predetermined threshold to substantially avoid entry into the thermal shutdown mode; and
   wherein the processor is further configured to control the welding-type apparatus to set the current duty cycle above the rated maximum duty cycle of the welding-type apparatus if the temperature associated with the welding-type apparatus is less than the predetermined threshold.

2. The controller of claim 1 further comprising a map residing in memory and having a plurality of thresholds and corresponding duty cycles therein accessible by the processor.

3. The controller of claim 1 wherein the predetermined threshold includes at least one of a welding-type apparatus temperature threshold, an engine oil temperature threshold, an output rectifier temperature threshold, an inverter temperature threshold, and an ambient temperature threshold.

4. The controller of claim 1 wherein the welding-type apparatus is a stud welder.

5. The controller of claim 1 further comprising an input configured to receive feedback indicative of at least one of an ambient temperature about the welding-type apparatus and a previously determined temperature of the welding-type apparatus.

6. The controller of claim 5 wherein the processor is configured to determine the variable maximum duty cycle from the feedback and increment the current duty cycle if the current duty cycle is less than the variable maximum duty cycle and decrement the current duty cycle if the current duty cycle is greater than the variable maximum duty cycle.

7. The controller of claim 1 wherein the processor is further configured to initialize a high thermal shutdown if the temperature associated with the welding-type apparatus is greater than a maximum temperature threshold.

8. The controller of claim 7 wherein the processor is further configured to terminate the high thermal shutdown after the temperature associated with the welding-type apparatus is below the maximum temperature threshold.

9. The controller of claim 7 wherein the processor is further configured to terminate the high thermal shutdown after a preset delay.

10. The controller of claim 1 wherein the processor is further configured to determine the variable maximum duty cycle from feedback including at least one of engine oil temperature feedback, output rectifier temperature feedback, inverter temperature feedback, ambient temperature feedback, duty cycle feedback, and hot start feedback.

11. The controller of claim 10 wherein the processor is further configured to control the welding-type apparatus to operate below the rated maximum duty cycle if the feedback is above the predetermined threshold to substantially delay entry into the thermal shutdown mode.

12. The controller of claim 10 wherein the processor is further configured to generate an operator notification if the feedback exceeds the predetermined threshold.

13. The controller of claim 12 wherein the operator notification includes at least one of an impending thermal shutdown notice, a thermal shutdown notice, and a thermal shutdown timer.

14. A method of operating a welding-type device comprising the steps of:
   determining a condition of at least one operating parameter of a welding-type device;
   determining a variable maximum duty cycle of the welding-type device from the condition of the at least one operating parameter;
   adjusting operation of the welding-type device according to the determined variable maximum duty cycle to substantially reduce thermal shutdowns; and
   further comprising the step of operating the welding-type device above a rated duty cycle if a current duty cycle is below the determined variable maximum duty cycle that is above the rated duty cycle.

15. The method of claim 14 further comprising the step of notifying an operator if the current duty cycle is not below the determined variable maximum duty cycle.

16. The method of claim 14 further comprising the step of automatically interrupting operation of the welding-type device if the at least one operating parameter is outside a desired operating range.

17. The method of claim 14 wherein the steps of determining a condition of at least one operating parameter, determining a variable maximum duty cycle, and adjusting operation of the welding-type device are performed automatically by a processor.

18. A method of operating a welding-type device comprising the steps of:
   determining a condition of at least one operating parameter of a welding-type device;
   determining a variable maximum duty cycle of the welding-type device from the condition of the at least one operating parameter;
   adjusting operation of the welding-type device according to the determined variable maximum duty cycle to substantially reduce thermal shutdowns;
   delaying operation of the welding-type device to reduce a duty cycle of the welding-type device below a rated duty cycle if the at least one operating parameter of the welding-type device is outside a desired operating range to substantially reduce thermal shutdowns; and
   adjusting operation of the welding-type device to increase the duty cycle of the welding-type device above the rated duty cycle.

19. A method of operating a welding-type device comprising the steps of:
   determining a condition of at least one operating parameter of a welding-type device;
   determining a variable maximum duty cycle of the welding-type device from the condition of the at least one operating parameter;
   adjusting operation of the welding-type device according to the determined variable maximum duty cycle to substantially reduce thermal shutdowns, wherein adjusting operation of the welding-type device includes adjusting operation of the welding-type device to increase the duty cycle of the welding-type device above a rated duty cycle of the welding-type device; and
   wherein the step of determining a condition of at least one operating parameter further includes monitoring at least one of a temperature of the welding-type device, an oil temperature of the welding-type device, a rectifier temperature of the welding-type device, an inverter temperature of the welding-type device, an ambient temperature surrounding the welding-type device, a duty cycle of the welding-type device, and a hot start of the welding-type device.

20. A welding-type device comprising:
   a welding-type power source configured to provide operational power for a welding-type process; and
   a controller configured:
      to monitor operating conditions associated with the welding-type device;
      to dynamically adjust a base duty cycle of the welding-type power source to operate above a rated duty cycle if the operating conditions are under a rated maximum parameter threshold of the operating conditions; and
      to dynamically adjust the base duty cycle of the welding-type power source to operate below the rated duty cycle if the operating conditions are over the rated maximum parameter threshold of the operating conditions to substantially reduce occurrences of entering a thermal shutdown mode.

21. The welding-type device of claim 20 wherein the controller is configured to control the welding-type power source to operate according to the base rated duty cycle if the operating conditions are within specifications of the welding-type device.

22. The welding-type device of claim 20 wherein the controller is configured to provide an operator alert if the operating conditions are not within specifications of the welding-type device.

23. The welding-type device of claim 20 wherein the welding-type process includes a stud welding process.

24. The welding-type device of claim 20 wherein the controller is further configured to initialize a thermal shutdown if a temperature associated with the welding-type power source is greater than a maximum temperature threshold.

25. The welding-type device of claim 24 wherein the controller is further configured to terminate the thermal shutdown after the temperature associated with the welding-type power source is below the maximum temperature threshold.

26. The welding-type device of claim 24 wherein the controller is further configured to terminate the thermal shutdown after a preset delay.

27. The welding-type device of claim 20 wherein the operating conditions include a welder temperature and a current welder duty cycle, and wherein the rated maximum parameter threshold includes a max welder temperature and a predetermined maximum duty cycle.

28. The welding-type device of claim 27 wherein the controller is further configured to identify the predetermined maximum welder temperature from the welder temperature and at least one of an ambient temperature about the welding-type power source and a previous welder temperature.

29. The welding-type device of claim 28 further comprising a lookup table stored in memory of the controller and including a plurality of predetermined maximum welder temperatures corresponding to at least one of a respective welder temperature, ambient temperature, and previous welder temperature.

30. A welding-type apparatus comprising:
means for detecting a temperature associated with a welding-type apparatus;
means for generating operational power for a welding-type process;
means for comparing the detected temperature associated with the welding-type apparatus to a temperature threshold;
means for controlling the means for generating operational power according to the means for comparing; and
wherein the means for controlling is configured to control the means for generating operational power to operate above a rated maximum duty cycle if the detected temperature of the welding-type apparatus is below the temperature threshold and to operate below a rated maximum duty cycle if the detected temperature of the welding-type apparatus is above the temperature threshold to substantially avoid thermal shutdown.

31. The welding-type apparatus of claim 30 wherein the detected temperature of the welding-type apparatus is derived from at least one of an engine oil temperature, an output rectifier temperature, an inverter temperature, and an ambient welding-type apparatus temperature.

32. A duty cycle controller comprising:
a processor configured to control a current duty cycle of a welding-type apparatus according to a variable maximum duty cycle to substantially delay entry into a thermal shutdown mode of the welding-type apparatus based on at least one operating condition; and
an input configured to receive feedback indicative of at least one of an ambient temperature about the welding-type apparatus and a previously determined temperature of the welding-type apparatus;
wherein the processor is further configured to determine the variable maximum duty cycle from the feedback and increment the current duty cycle if the current duty cycle is less than the variable maximum duty cycle and decrement the current duty cycle if the current duty cycle is greater than the variable maximum duty cycle, and wherein the processor is configured to increment the current duty cycle above a rated duty cycle of the welding-type apparatus if the at least one of the ambient temperature about the welding-type apparatus and the previously determined temperature of the welding-type apparatus is below a predetermined threshold.

* * * * *